United States Patent [19]
Calkins

[11] Patent Number: 6,022,617
[45] Date of Patent: Feb. 8, 2000

[54] DECORATIVE NON-SLIP LINER OR MAT

[75] Inventor: Mark A. Calkins, Los Angeles, Calif.

[73] Assignee: Kittrich Corporation, La Mirada, Calif.

[21] Appl. No.: 09/064,017

[22] Filed: Apr. 20, 1998

[51] Int. Cl.$^7$ .................................................. B32B 7/12
[52] U.S. Cl. ............................ 428/354; 428/95; 428/96; 428/161; 428/206; 428/261; 428/290; 428/291; 428/323; 428/424.6; 428/904.4; 442/101; 442/149; 442/401; 427/203; 427/208.4; 297/219.1; 156/220; 156/249; 156/298
[58] Field of Search ..................................... 428/354, 261, 428/206, 95, 161, 96, 290, 291, 323, 424.6, 904.4, 207; 442/149, 101, 401; 427/203, 208.4; 52/177; 297/219.1; 156/298, 323, 324, 220, 249

[56] References Cited

U.S. PATENT DOCUMENTS

| | | |
|---|---|---|
| 922,703 | 5/1909 | Knapp . |
| 1,499,166 | 6/1924 | Frazier . |
| 2,622,039 | 12/1952 | Bingell ........................................ 117/8 |
| 3,360,422 | 12/1967 | Desch ......................................... 161/89 |
| 3,620,890 | 11/1971 | Kemmler ...................................... 161/6 |
| 3,804,700 | 4/1974 | Hoey ........................................ 161/160 |
| 3,891,487 | 6/1975 | Hoey ........................................... 156/78 |
| 3,911,186 | 10/1975 | Trotman .................................... 428/137 |
| 3,933,548 | 1/1976 | Anderson, Jr. et al. ................... 156/78 |
| 4,137,356 | 1/1979 | Shoemaker et al. ..................... 428/211 |
| 4,329,386 | 5/1982 | Samowich ................................ 428/196 |
| 4,336,293 | 6/1982 | Eiden ....................................... 428/143 |
| 4,385,090 | 5/1983 | Sims ......................................... 428/121 |
| 4,409,275 | 10/1983 | Samowich ................................ 428/138 |
| 4,582,554 | 4/1986 | Bell et al. ................................. 156/247 |
| 4,654,099 | 3/1987 | Sandman .................................. 156/220 |
| 4,756,951 | 7/1988 | Wang et al. .............................. 428/204 |
| 4,863,782 | 9/1989 | Wang et al. .............................. 428/204 |
| 5,120,587 | 6/1992 | McDermott, III et al. ................ 428/40 |
| 5,308,695 | 5/1994 | Arakawaet ............................... 428/354 |
| 5,346,278 | 9/1994 | Dehondt .................................. 297/219.1 |
| 5,433,979 | 7/1995 | Williams .................................. 427/496 |
| 5,682,613 | 11/1997 | Dinatale ....................................... 2/168 |
| 5,707,903 | 1/1998 | Schottenfeld ............................. 442/30 |
| 5,787,655 | 8/1998 | Saylor, Jr. .................................. 52/181 |
| 5,851,161 | 12/1998 | Sassak ....................................... 473/596 |
| 5,854,144 | 12/1998 | Hawley ...................................... 442/56 |
| 5,863,845 | 1/1999 | Owen ....................................... 442/101 |
| 5,874,371 | 2/1999 | Owen ....................................... 442/101 |

*Primary Examiner*—Deborah Jones
*Assistant Examiner*—Abraham Bahta
*Attorney, Agent, or Firm*—D. W. Eggins

[57] ABSTRACT

The laminated non-slip liner or mat comprises a first laminate layer of nonwoven material having a first surface and a second surface, the second surface having printed thereon a pattern of relatively high friction material; a second laminate layer of material having a first surface and a second surface; and an adhesive between the first and second layers, bonding the first layer first surface to the second layer second surface. The first laminate layer of nonwoven material acts as a barrier between the pattern of relatively high friction material and the adhesive. Preferably, the pattern of relatively high friction material is a high density matrix of printed latex or polyvinyl chloride projections. The second laminate layer may be a printed vinyl sheet.

16 Claims, 2 Drawing Sheets

DECORATIVE NON-SLIP LINER OR MAT

BACKGROUND OF THE INVENTION

1. Field of the Invention

The present invention relates to decorative laminated non-slip liners or mat, and more particularly to an improved decorative laminated non-slip liner or mat which avoids delamination, has a lay-flat characteristic when unrolled, and has a smooth decorative surface with no discernable visual or physical surface discontinuities transferred from the underlying substrate.

2. Brief Description of the Prior Art

Prior art decorative non-slip liners utilize frictionalizing materials foamed on a coated scrim. Such frictionalized material is then permanently laminated to a printed vinyl substrate.

The primary disadvantage of the prior art concerns the frictionalizing material layer used within the lamination process. As an example, reference is made to U.S. Pat. No. 5,707,903 to Schottenfeld. The frictionalizing material layer of Schottenfeld is created by the submersion of woven or knitted scrim in a polyvinyl chloride (PVC) foaming compound. The substrate is then exposed to heat, activating blowing agents within the compound and curing the foaming compound along the framework of yarns making up the woven or knitted scrim. The inherent nature of this process is the formation of an uneven surface on both sides of the frictionalizing material layer (see FIG. 3 of Schottenfeld). The primary drawback of the frictionalizing medium is that this random uneven surface, coupled with the pattern formation of the foamed polyvinyl chloride (PVC), will visibly and physically penetrate through to the attached laminated vinyl layer.

Another problem with the prior art is that the frictionalizing compound contains a plasticiser, i.e. an oil, used to solvate the polyvinyl chloride (PVC) resin. Plasticiser is a key ingredient within the non-slip composition, and is known to migrate within the substrate after it has been cured. The migration of this component will break down the bonding qualities of the adhesive utilized to affix a vinyl sheet to the foamed non-slip substrate. The inherently uneven face of the coated material provides limited surface area to effect a bond. This, coupled with the decomposition of the adhesive, results in eventual delamination of the two substrates.

Yet another shortcoming of the prior art relates to its lay-flat characteristics. The unbalanced construction inherently present with the materials used in the prior art will not initially conform to a flat surface (again referencing FIG. 3 of Schottenfeld), and the liner will curl in upon itself when removed from tubular packaging. This is a common phenomenon for laminated substrates of dissimilar thickness, intensified by the migratory shrinking action of adhesive, which will cure further after the lamination process. Although some adhesives have been developed to resist the adverse reaction of plasticisers, it should be noted that the physical properties of foamed PVC scrim laminated to a decorative vinyl layer will still cause the product to retain an initial roll set or memory.

Another related reference of prior art is U.S. Pat. No. 4,137,356 to Shoemaker et al. (Shoemaker). The Shoemaker place mat is constructed of a paper or plastic sheet upon each side of which is imprinted a pattern of high friction material. However, the top surface of the Shoemaker place mat is not a decorative surface, is not of laminated construction, and does not exhibit a smooth top surface, i.e., it has a number of projections effective in imparting anti-skid and anti-slip characteristics to the top of the mat to reduce slipping or skidding of glasses, dishes, and the like placed thereon.

A number of other prior art activities have addressed the issue of preventing slippage of items such as place mats, liners, and the like. However, none have solved the aforementioned problems associated with a non-slip decorative liner.

Accordingly, there is a need in the art for an improved decorative non-slip liner.

SUMMARY OF THE INVENTION

The present invention addresses the shortcomings and problems associated with the prior art. In accordance with the invention, there is provided a laminated non-slip liner or mat, comprising: a bottom, or first, laminate layer of nonwoven material having a first surface and a second surface, the second surface having printed thereon a pattern of relatively high friction material; a top, or second, laminate layer of material having a first surface and a second surface; and an adhesive between the first and second layers, bonding the first layer first surface to the second layer second surface.

With this construction, the first laminate layer of nonwoven material acts as a barrier between the pattern of relatively high friction material and the adhesive.

It will be understood that the invention may be implemented in the form of a decorative non-slip shelf or drawer liner, or in the form of a decorative non-slip mat such as a coaster or place mat. In this specification, an example of a decorative non-slip liner will be described for convenience.

Preferably, the pattern of relatively high friction material is a high density matrix of printed latex or polyvinyl chloride projections in a dot configuration. Alternatively, any symmetrical or random arrangement of any of a number of other geometric configurations of the projections is acceptable, provided such projections are laid out in a high density pattern to eliminate unevenness at the interface with the nonwoven material.

In a preferred embodiment, the nonwoven laminate material is selected from the group consisting of spun bound nonwoven polyester, spun bound natural or synthetic fibrous material, paper, plastic sheet material, natural or synthetic sheet material, and plastic-coated paper sheet material. The top, or second, laminate layer is typically a printed decorative vinyl sheet having smooth first and second surfaces.

With the use of a nonwoven substrate and a close configuration on the printed high friction projections, the upper surface of the nonwoven laminate layer is smooth, i.e. continuous and without surface discontinuities, for effecting full surface area contact with the adhesive and the unprinted surface of the top vinyl sheet laminate layer.

If desired, the high friction printed projections may be pigmented with color.

In order to minimize the curling effect seen in many of the prior art non-slip liners, the construction of the present invention permits the nonwoven substrate layer and the decorative vinyl sheet layer to be of approximately the same thickness.

Additionally, if a softer feel is desired for the decorative non-slip liner, the relatively high friction material may be selected from a foamed latex or foamed polyvinyl chloride resin.

BRIEF DESCRIPTION OF THE DRAWING

These and other aspects of the invention will be better understood, and additional features of the invention will be described hereinafter having reference to the accompanying drawings in which.

DETAILED DESCRIPTION OF THE PREFERRED EMBODIMENTS

Figure 1:
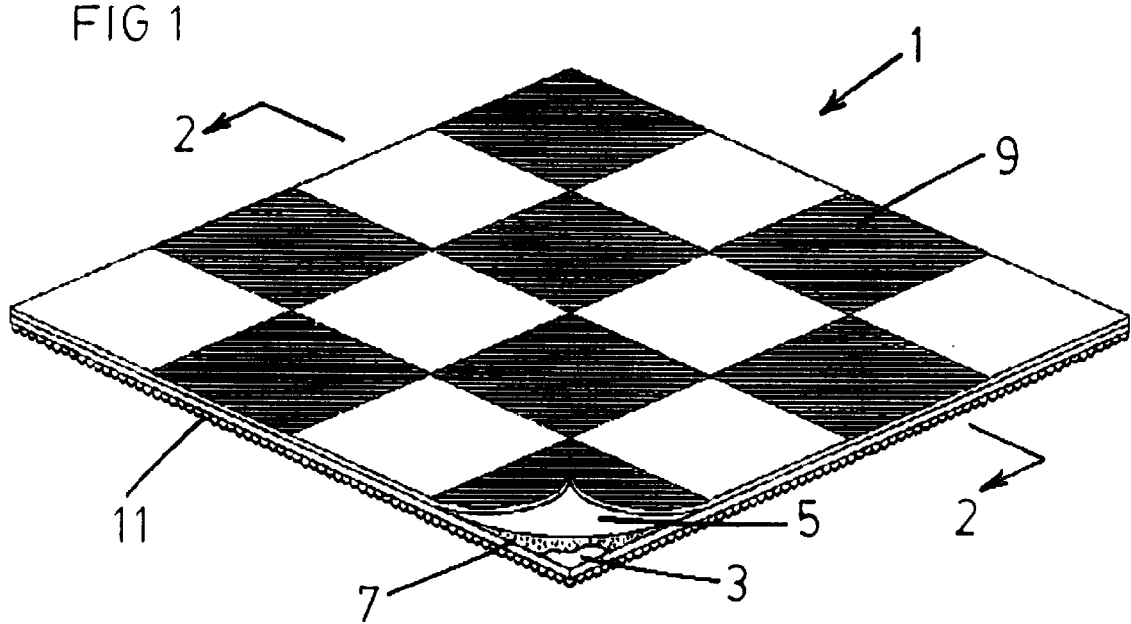
FIG. 1 is a perspective view of a decorative non-slip liner constructed in accordance with the present invention with one corner separated to show the two-layer, i.e. laminated, construction.

FIG. 1 is a perspective view of a laminated non-slip liner 1 made in accordance with the present invention, the liner 1 comprising a substrate 3 defined by a first laminate layer 3 of nonwoven material having an upper, or first, surface 13 and a lower, or second, surface 15. The lower surface 15 has printed thereon a pattern of relatively high friction material shown in FIG. 2 as closely packed dots 11.

The liner 1 further includes a second laminate layer 5, preferably a decorative vinyl sheet, having an upper, or first, surface 17 and a lower, or second, surface 19. The upper surface 17 of the second laminate layer 5 has imprinted thereon, or therein, a decorative image 9.

The two first and second laminate layers 3 and 5 are joined together by an adhesive layer 7.

Figure 2:
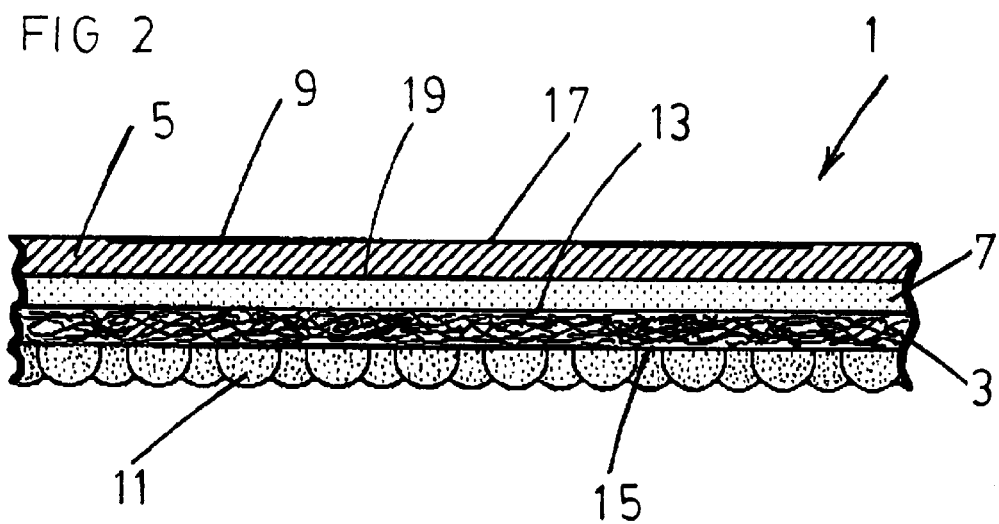
FIG. 2 is a partial cross sectional view taken along the line 2—2 of FIG. 1.

It will be observed from FIG. 2, a cross sectional view taken along the line 2–2 in FIG. 1, that the upper surface 13 of the bottom nonwoven layer 3 is smooth and planar. similarly, the lower surface 19 of the top laminate layer 5 is likewise smooth and planar. As a result, although the pattern of relatively high friction structures 11 (e.g. printed latex polyvinyl chloride (PVC) dots) are discontinuous along the lower surface 15 of the nonwoven substrate 3, the discontinuous pattern of dots 11 do not cause any visible or physical distortions of the vinyl sheet top layer 5. Thus, the top decorative vinyl sheet 5 will maintain a smooth appearance, while the bottom non-slip frictionalized nonwoven layer 3 provides sufficient non-slip protection for the surface to which it is applied.

Figure 3:
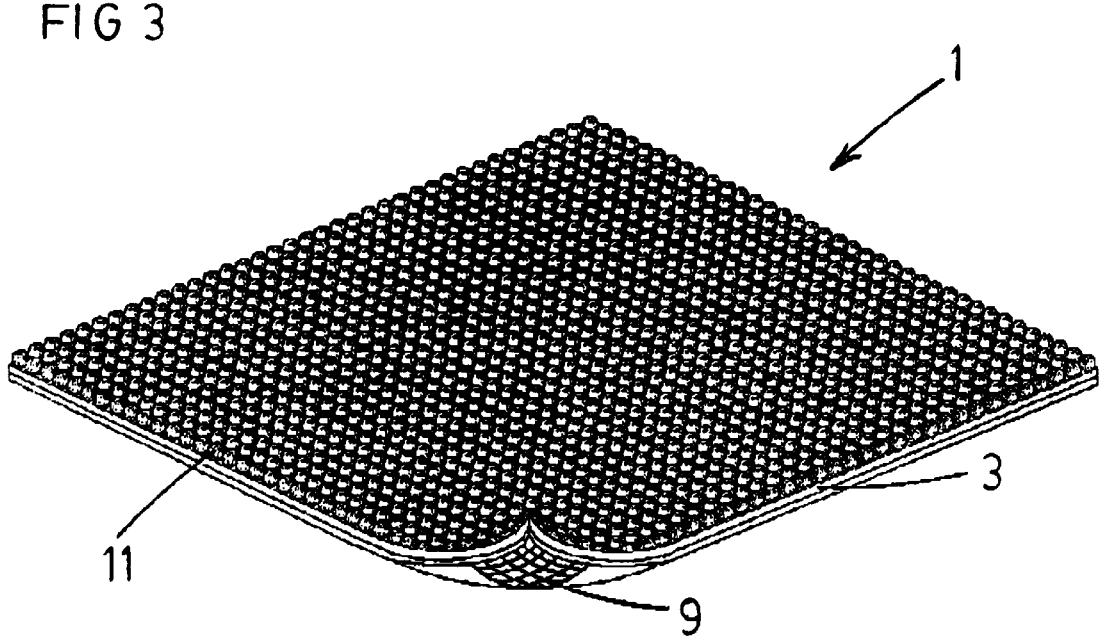
FIG. 3 is a perspective view of the underside of a decorative non-slip liner constructed in accordance with the present invention with one corner turned up to show a portion of the topside.

FIG. 3 is a perspective view of the underside of the decorative non-slip liner 1 with one corner turned up to show a portion of the topside surface 17. The compact symmetrical pattern of high friction dot structures 11 are evident in this view. It is to be understood, however, as noted above, that other symmetrical or random arrangements of other geometric projection configurations may be chosen and are equally as acceptable while maintaining a smooth topside surface 17, an important feature of the present invention.

The present invention is a departure from the prior art, in that it incorporates the controlled formation of frictionalizing materials 11 upon one side, the lower surface 15, of a smooth nonwoven, spun bound, polyester liner substrate 3. The nonwoven substrate 3 is printed with a series, or matrix, of polyvinyl chloride (PVC) projections, e.g. "dots" 11, or any other frictionalizing material in a suitable pattern to effect maximum surface resistance. The printing of the non-slip compounds produces predictable results and eliminates the random uneven surface caused by the methods employed in the prior art. The unprinted side 13 of the frictionalized nonwoven substrate 3 is then permanently laminated to the reverse side 19 of a decoratively printed vinyl sheet 5.

The construction of the present invention avoids the delamination characteristics present in known prior art non-adhesive, non-slip decorative liners. The frictionalized material 11 does not come into contact with the adhesive layer 7 in the liner, according to the present invention. The nonwoven substrate 3 thus acts as a protective barrier between these two components, and therefore, the bonding qualities of the adhesive are not adversely affected by any migratory characteristics of plasticiser within the chosen frictionalizing resin for the printed projections 11. Moreover, unlike the prior art, the full unprinted planar surface area 13 of the nonwoven non-slip liner substrate 3 comes into adhesive contact with the lower planar surface 19 of the attached decorative vinyl sheet 5. Since more surface area is utilized, as compared, for example, to the liner construction according to the aforementioned Schottenfeld patent, a stronger laminating bond is formed which could not be achieved by virtue of the open cells present in the prior art.

An additional feature of the present invention is the preferred embodiment of utilizing printed foamed polyvinyl chloride (PVC) as the frictionalizing agent in the construction of the printed projections 11 on the nonwoven substrate 3. The printed polyvinyl chloride (PVC) projections 11 can be pigmented with a variety of colors.

Yet a further benefit of the present invention is the superior lay-flat characteristics it has over the prior art. A balanced construction is achieved due to the construction wherein the nonwoven substrate 3 is of a similar thickness to the vinyl sheet 5 attached thereto. The fibrous nonwoven material 3 allows the finished product greater flexibility to avoid roll set or memory when it is taken out of packaging.

In summary, the present invention provides a number of advantages over prior art non-slip liners. For example, the present invention avoids delamination, due to the fact that the frictionalized material 11 does not come into contact with the adhesive layer 7. Additionally, full surface contact is made between the nonwoven substrate 3 and the decorative vinyl sheet 5, the interfacial surfaces of these two laminate layers being smooth and substantially planar. In the preferred embodiment, the frictionalizing agent is foamed printed polyvinyl chloride (PVC). Additionally, the liner of the present invention exhibits exceptionally good lay-flat characteristics due to the thicknesses of the nonwoven substrate and the top vinyl sheet being of approximately the same thickness. Finally, due to the smooth surfaces joined by the adhesive layer 7, there is no discontinuous surface contact between the nonwoven substrate 3 and the vinyl sheet 5, and therefore there is no visible or physical penetration of the surface characteristics of the nonwoven liner 3 through to the laminated vinyl layer 5 attached thereto.

While only certain embodiments of the invention have been set forth above, alternative embodiments and various modifications will be apparent from the above description and the accompanying drawing to those skilled in the art. For example, if desired, there need not be a pattern or design 9 in the top layer 5, or there may be a pattern on the lower surface 19 of the top layer 5, or the pattern or design in the top layer 5 may extend completely through it. The laminated non-slip liner 1 may be manufactured in a large or long sheet, in roll form, in rectangles, or in narrow strips, depending on need. If desired, the shapes of the bottom and top layers 3,5 may be of different patterns. For example, using a paper, plastic, or plastic covered paper bottom layer 3, and applying adhesive only on the lower surface 19 of the top layer 5, a scalloped top layer 5 may be fitted centrally onto a rectangular bottom layer 3 of larger dimensions, thereby providing a decorative non-slip mat arrangement. These and other alternatives are considered equivalents and within the spirit and scope of the present invention.

What is claimed is:

1. A laminated non-slip liner or mat, comprising:
   a first laminate layer of nonwoven material having a first surface and a second surface, the second surface having printed thereon a pattern of relatively high friction material;
   a second laminate layer of material having a first surface and a second surface; and
   an adhesive between the first and second layers, bonding said first layer first surface to said second layer second surface.

2. The laminated non-slip liner or mat as claimed in claim 1, wherein said pattern of relatively high friction material is a high density matrix of printed latex or polyvinyl chloride projections.

3. The laminated non-slip liner or mat as claimed in claim 2, wherein said projections have a random or geometric dot configuration.

4. The laminated non-slip liner or mat as claimed in claim 1, wherein said nonwoven laminate material is selected from the group consisting of spun bound nonwoven polyester, spun bound natural or synthetic fibrous material, paper, plastic sheet material, natural or synthetic sheet material, and plastic-coated paper sheet material.

5. The laminated non-slip liner or mat as claimed in claim 1, wherein said second laminate layer is a printed vinyl sheet.

6. The laminated non-slip liner or mat as claimed in claim 5, wherein said second laminate layer is a decorative vinyl sheet having smooth first and second surfaces.

7. The laminated non-slip liner or mat as claimed in claim 5, wherein:
   said first surface of said printed vinyl sheet has decorative imprinting thereon; and
   said second surface of said printed vinyl sheet is adhered to said first surface of said first laminate layer.

8. The laminated non-slip liner or mat as claimed in claim 6, wherein said first layer first surface and said second layer second surface are continuous and without surface discontinuities for effecting full surface area contact of said adhesive with the unprinted surfaces of said nonwoven and said vinyl sheet laminates.

9. The laminated non-slip liner or mat as claimed in claim 2, wherein said latex projections are pigmented with color.

10. The laminated non-slip liner or mat as claimed in claim 1, wherein said first and second laminates have substantially equal thicknesses.

11. The laminated non-slip liner or mat as claimed in claim 1, wherein said relatively high friction material is a foamed latex or polyvinyl chloride resin.

12. The laminated non-slip liner or mat as claimed in claim 1, wherein said relatively high friction material comprises a blowing agent to provide cushioned support to said second laminate layer.

13. The laminated non-slip liner or mat as claimed in claim 1, wherein said first and second laminate layers are of different shapes or sizes.

14. A laminated non-slip liner or mat, comprising:
   a first laminate layer of frictionalized printed spun bound nonwoven polyester material; and
   a second laminate layer of printed vinyl adhesively attached to said first laminate layer.

15. The laminated non-slip liner or mat as claimed in claim 14, wherein said second laminate layer is adhesively bonded to said first laminate layer with continuous and full surface area contact between respective planar surfaces of said first and second laminate layers.

16. The laminated non-slip liner or mat as claimed in claim 1, wherein said first and second laminate layers are of different shapes or sizes.

* * * * *